(12) United States Patent
Harris

(10) Patent No.: US 7,081,754 B1
(45) Date of Patent: Jul. 25, 2006

(54) METAL DETECTION SYSTEM WITH A MAGNETOMETER HEAD COUPLEABLE TO CONVENTIONAL FOOTWARE AND METHOD OF USE

(76) Inventor: Al Harris, P.O. Box 1007, San Fernando, CA (US) 91341

( * ) Notice: Subject to any disclaimer, the term of this patent is extended or adjusted under 35 U.S.C. 154(b) by 176 days.

(21) Appl. No.: 10/789,715

(22) Filed: Feb. 27, 2004

(51) Int. Cl.
  *G01V 3/165* (2006.01)
  *G01V 3/08* (2006.01)
  *G01V 3/11* (2006.01)

(52) U.S. Cl. ...................... 324/329; 324/326
(58) Field of Classification Search ................ 324/329, 324/323, 326, 260, 262, 228, 234, 239, 243; 340/568.1, 540, 686.6, 551; 36/1, 136
See application file for complete search history.

(56) References Cited

U.S. PATENT DOCUMENTS

| | | | |
|---|---|---|---|
| 3,947,756 A | 3/1976 | Ryss et al. | |
| 6,006,646 A * | 12/1999 | Makris et al. | 89/36.05 |
| 6,286,235 B1 | 9/2001 | An | |
| 6,408,545 B1 | 6/2002 | Song | |
| 6,536,553 B1 * | 3/2003 | Scanlon | 181/108 |
| 6,606,803 B1 * | 8/2003 | Ritter et al. | 36/11.5 |
| 6,621,418 B1 * | 9/2003 | Cayrol | 340/573.1 |

FOREIGN PATENT DOCUMENTS

| | | | |
|---|---|---|---|
| CH | 552816 | * | 8/1974 |
| DE | 3027189 A | * | 2/1982 |
| FR | 2762486 | * | 10/1998 |
| FR | 2762487 A1 | * | 10/1998 |
| FR | 2813014 | * | 2/2002 |
| GB | 2123559 | * | 2/1984 |

* cited by examiner

*Primary Examiner*—Bot Ledynh
*Assistant Examiner*—Kenneth J. Whittington

(57) ABSTRACT

A metal detection system with a magnetometer head coupleable to conventional footware and method of use for facilitating hands-free detection of metals below a surface of the ground adjacent to a user. The metal detection system with a magnetometer head coupleable to conventional footware and method of use includes a magnetometer assembly, a control assembly, and a coupling assembly. The magnetometer assembly is designed for passing over a surface and detecting metal below the surface. The control assembly is operationally coupled to the magnetometer assembly, and facilitates operational control of the magnetometer assembly. The coupling assembly operationally couples the magnetometer assembly to a piece of conventional footware.

18 Claims, 4 Drawing Sheets

METAL DETECTION SYSTEM WITH A MAGNETOMETER HEAD COUPLEABLE TO CONVENTIONAL FOOTWARE AND METHOD OF USE

BACKGROUND OF THE INVENTION

1. Field of the Invention

The present invention relates to metal detectors and more particularly pertains to a new metal detection system with a magnetometer head coupleable to conventional footware and method of use for facilitating hands-free detection of metals below a surface of the ground adjacent to a user.

2. Description of the Prior Art

The use of metal detectors and shoe-mounted electronics is known in the prior art. Illustrative examples include U.S. Pat. No. 3,947,756; U.S. Pat. No. 6,286,235; and U.S. Pat. No. 6,408,545.

While these devices fulfill their respective, particular objectives and requirements, the need remains for a system that allows hands-free operation of the magnetometer assembly and provides greater flexibility of operation for the user.

SUMMARY OF THE INVENTION

An advantage of the present invention is its operational capability of scanning an area behind the user for treasure hunting, or an area ahead of the user for either treasure hunting, line detection or mine detection.

Another advantage of the present invention is audio signaling corresponding with the detection of metal below the surface allowing the user to look at the surrounding environment rather that at a control panel or indicator meter.

Yet another advantage of the present invention is the capability of using a single system coupled to one piece of conventional footware, or using two systems, each coupled to an associated piece of conventional footware thereby doubling the effective area covered.

To this end, the present invention generally comprises a magnetometer assembly, a control assembly, and a coupling assembly. The magnetometer assembly is designed for passing over a surface and detecting metal below the surface. The control assembly is operationally coupled to the magnetometer assembly, and facilitates operational control of the magnetometer assembly. The coupling assembly operationally couples the magnetometer assembly to a piece of conventional footware.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
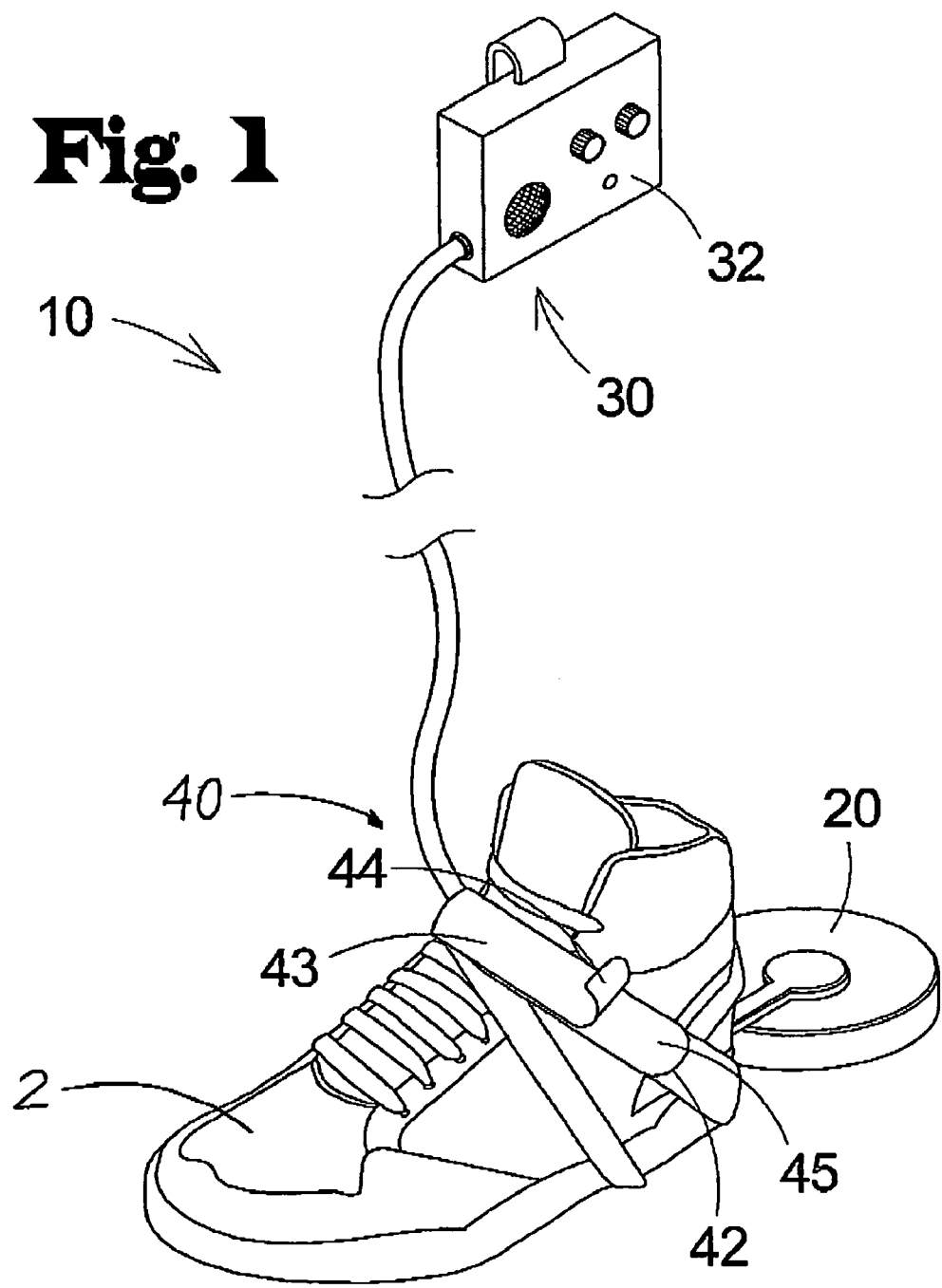
FIG. 1 is a schematic perspective view of a new metal detection system with a magnetometer head coupleable to conventional footware and method of use according to the present invention.
Figure 2:
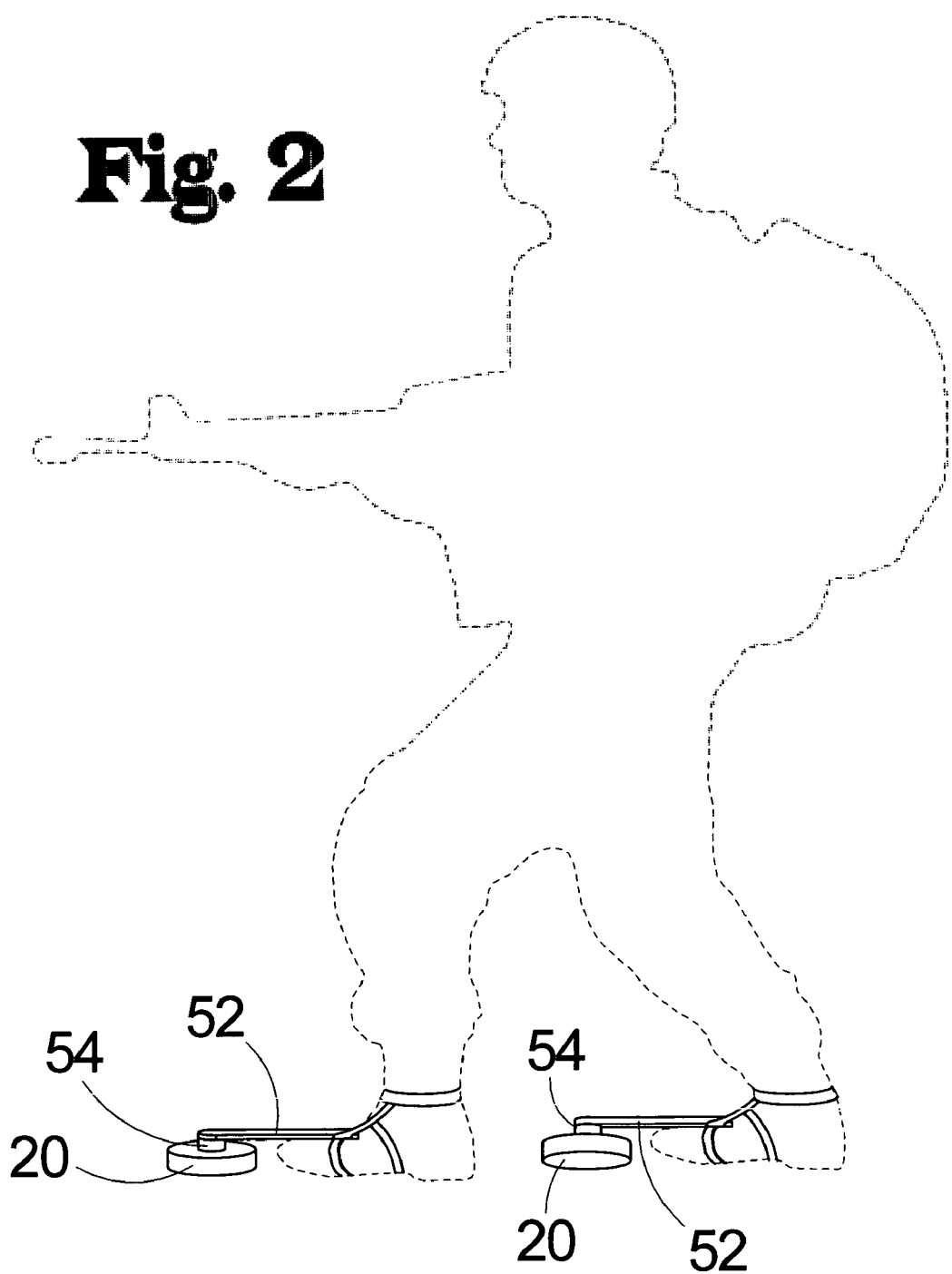
FIG. 2 is a schematic perspective view of the present invention in use.
Figure 3:
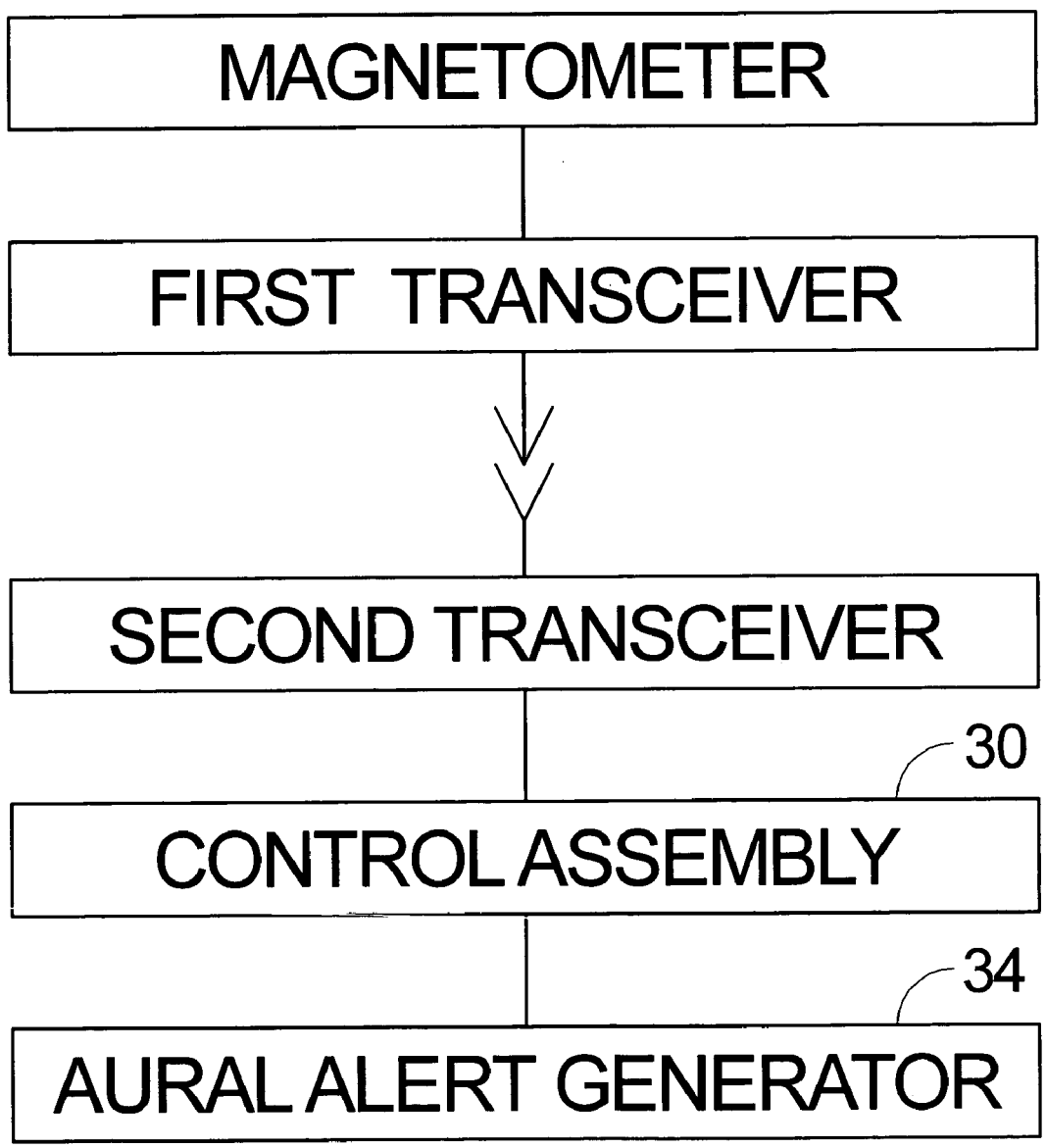
FIG. 3 is a schematic functional interconnect diagram of the present invention.
Figure 4:
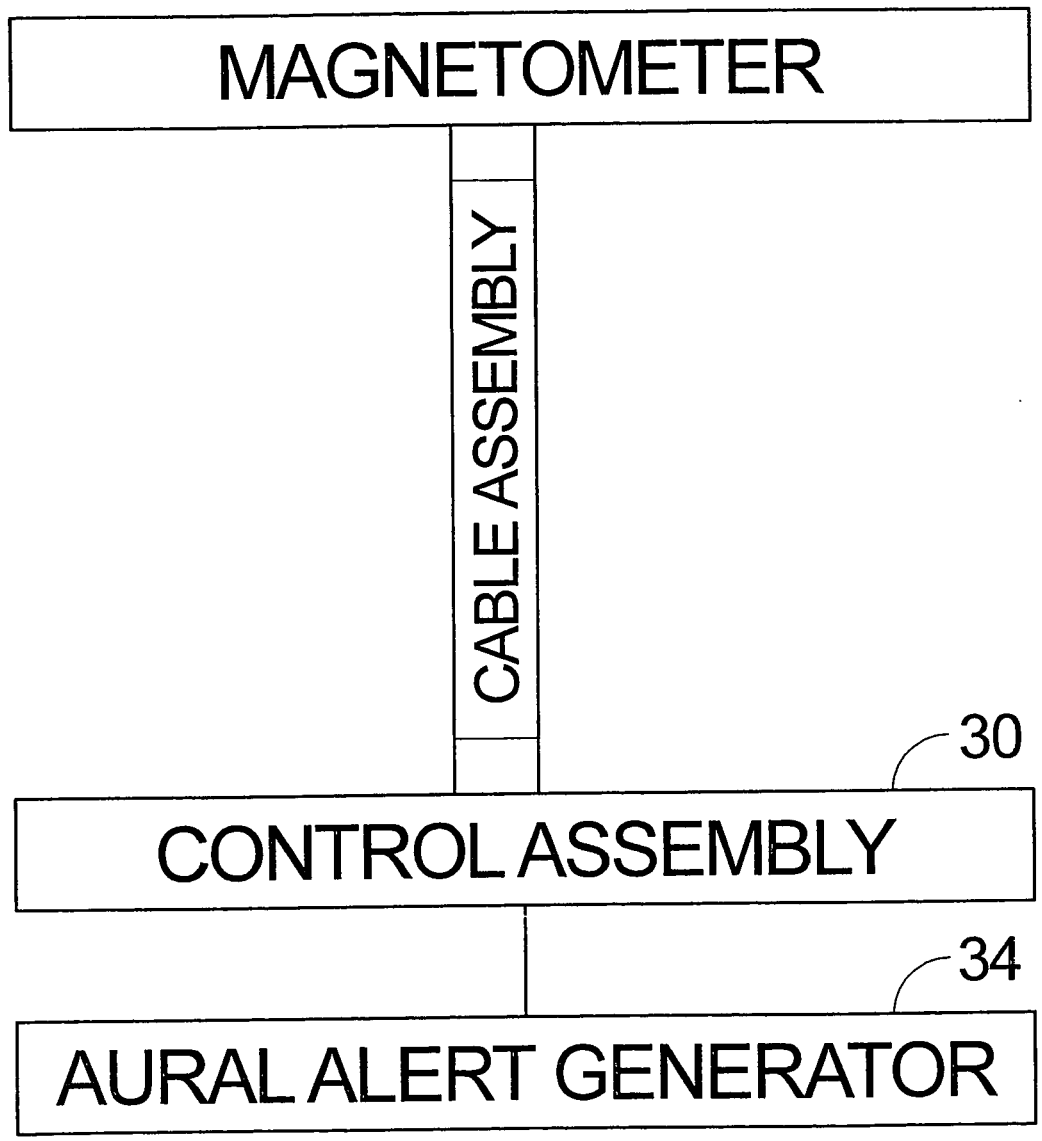
FIG. 4 is a schematic functional interconnect diagram of the present invention using a cable assembly to provide a communications channel between the magnetometer assembly and the control assembly.

With reference now to the drawings, and in particular to FIGS. 1 through 4 thereof, a new metal detection system with a magnetometer head coupleable to conventional footware and method of use embodying the principles and concepts of the present invention and generally designated by the reference numeral 10 will be described.

As best illustrated in FIGS. 1 through 4, the metal detection system with a magnetometer head coupleable to conventional footware and method of use 10 generally comprises a magnetometer assembly 20, a control assembly 30, and a coupling means 40.

The magnetometer assembly 20 is designed for passing over a surface and detecting metal below the surface. The control assembly 30 is operationally coupled to the magnetometer assembly 20, and facilitates operational control of the magnetometer assembly 20. The coupling means 40 operationally couples the magnetometer assembly 20 to a piece of conventional footware 2.

Preferably the control assembly 30 further comprises a housing 32, which may be coupled (coupleable) to an article of clothing of a user facilitating hands-free operation. Suitable articles of clothing include, but certainly are not limited to belts, vests, shirts, pants, hats, headbands, or any other article of clothing which may conveniently retain the housing 32.

The coupling means 40 may be any number of devices or mechanisms to either selectively or permanently coupled the magnetometer assembly to the conventional footware 2. These might include, but at not limited to straps, belts, screws, buttons, snaps, adhesives, zippers, rivets, or other suitable devices. Preferably, the coupling means 40 includes a strap assembly 41 designed for is secured around a heal portion of the conventional footware 2. The strap assembly 41 includes a first end 42 positionable adjacent to a first side of the conventional footware 2. The strap assembly 41 also includes a second end 43 positionable along a second side of the conventional footware 2 and over a top of the conventional footware 2. The second end 43 is selectively securable to the first end 42. Thus, the strap assembly 41 is selectively secured to the conventional footware 2.

While any number of methods may be used to selectively secure the first end of the strap assembly 41 to the second end of the strap assembly 41, such as buttons, snaps, buckles, zippers and the like, the preferred method is hook and loop fastener. Preferably, the strap assembly 41 further comprises a first portion of hook and loop fastener 44 operationally coupled to the first end 42 of the strap assembly 41 and a second portion of hook and loop fastener 45 operationally coupled to the second end 43 of the strap assembly 41. The first portion of hook and loop fastener 44 is complementary to the second portion of hook and loop fastener 45.

The magnetometer assembly 20 may be in communication with the control assembly 30 either through a wired connection or a wireless connection.

In at least one embodiment the control assembly 30 further comprises an aural alert generator 34. The aural alert generator 34 emits an aural alert when the magnetometer assembly 20 detects metal. The aural alert generator 34 facilitates signaling the user of a presence of metal below the magnetometer assembly 20.

In a further embodiment, an extension means 50 is operationally coupled between the strap assembly 41 and the magnetometer assembly 20. The extension means 50 facilitates placement of the magnetometer assembly 20 away from a foot of a user. Preferably, the extension means 50 further comprises a horizontal extent 52 and a vertical extent 54. The horizontal extent 52 includes a first end operationally coupled to the strap assembly 41. The horizontal extent 52 facilitates holding the magnetometer assembly 20 at a predetermined lateral distance from the foot of the user. The vertical extent 54 may be operationally coupled between a second end of the horizontal extent 52 and the magnetometer assembly 20. The vertical extent 54 facilitates a vertical placement of the magnetometer assembly 20 above a surface.

In still a further embodiment the extension means 50 is designed for positioning the magnetometer assembly 20 in front of the user.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A metal detection system with a magnetometer head coupleable to footwear, the system comprising:
   a magnetometer assembly adapted for passing over a surface and detecting metal below the surface;
   a control assembly operationally coupled to said magnetometer assembly, said control assembly facilitating operational control of said magnetometer assembly; and
   a coupling means operationally coupling said magnetometer assembly to the footwear;
   wherein said coupling means further comprises:
      a strap assembly adapted for being secured around a heel portion of the footwear, said strap assembly having a first end positionable adjacent to a first side of the footwear, said strap assembly having a second end positionable along a second side of the footwear and over a top of the footwear, said second end being selectively securable to said first end whereby said strap assembly is selectively secured to the footwear; and an extension means operationally coupled between said strap assembly and said magnetometer assembly, said extension means facilitating placement of said magnetometer assembly away from a foot of a user;
   wherein said extension means further comprises:
      a horizontal extent with a first end operationally coupled to said strap assembly, said horizontal extent facilitating a lateral distance between the foot of the user and the magnetometer assembly; and
      a vertical extent operationally coupled between a second end of said horizontal extent and said magnetometer assembly, said vertical extent facilitating a vertical placement of said magnetometer assembly above a surface.

2. The system of claim 1, further comprising a cable assembly having a first end coupled to said magnetometer assembly, said cable assembly having a second end coupled to said control assembly, said cable assembly routing signal communication between said magnetometer assembly and said control assembly.

3. The system of claim 1, further comprising:
   a first transceiver operationally coupled to said magnetometer assembly for transmitting signal from said magnetometer assembly and receiving signals from said control assembly;
   a second transceiver operationally coupled to said control assembly for transmitting signals from said control assembly and receiving signals from said magnetometer assembly.

4. The system of claim 1, wherein said control assembly further comprises a housing, said housing being coupleable to an article of clothing of a user facilitating hands-free operation.

5. The system of claim 1, wherein said strap assembly further comprises a first portion of hook and loop fastener operationally coupled to said first end of said strap assembly and a second portion of hook and loop fastener operationally coupled to said second end of said strap assembly, said first portion of hook and loop fastener being complementary to said second portion of hook and loop fastener.

6. The system of claim 1, further comprising:
   said control assembly further comprises a housing, said housing being coupleable to an article of clothing of a user facilitating hands-free operation; and
   said strap assembly further comprises a first portion of hook and loop fastener operationally coupled to said first end of said strap assembly and a second portion of hook and loop fastener operationally coupled to said second end of said strap assembly, said first portion of hoop and loop fastener being complementary to said second portion of hook and loop fastener.

7. The system of claim 6, further comprising a cable assembly having a first end coupled to said magnetometer assembly, said cable assembly having a second end coupled to said control assembly, said cable assembly routing signal communication between said magnetometer assembly and said control assembly.

8. The system of claim 6, further comprising:
   a first transceiver operationally coupled to said magnetometer assembly for transmitting signal from said magnetometer assembly and receiving signals from said control assembly;
   a second transceiver operationally coupled to said control assembly for transmitting signals from said control assembly and receiving signals from said magnetometer assembly.

9. The system of claim 6, wherein said control assembly further comprises an aural alert generator, said aural alert generator emitting an aural alert when said magnetometer assembly detects metal, said aural alert generator facilitating signaling the user of a presence of metal below said magnetometer assembly.

10. The system of claim 1, wherein said control assembly further comprises an aural alert generator, said aural alert generator emitting an aural alert when said magnetometer assembly detects metal, said aural alert generator facilitating signaling the user of a presence of metal below said magnetometer assembly.

11. The system of claim 1, wherein said extension means being adapted for positioning said magnetometer assembly in front of the user.

12. A combination comprising:
an article of footwear having a toe portion located towards a front of the foot wear and a heel portion located towards a rear of the footwear; and
a metal detection system removably mounted on the article of footwear, the system comprising:
a magnetometer assembly configured to detect metal below a surface when the magnetometer assembly is passed over the surface;
a control assembly operationally coupled to said magnetometer assembly for controlling said magnetometer assembly; and
a coupling means for removably coupling said magnetometer assembly to the article of footwear, said coupling means being configured such that said magnetometer assembly is supported rearwardly of the heel portion of said article of footwear.

13. The combination of claim 12 wherein said coupling means further comprises:
a strap assembly removably secured around the heel portion of said article of footwear, said strap assembly having a first end positionable adjacent to a first side of said article of footwear, said strap assembly having a second end positionable along a second side of said article of footwear and over a top of said article of footwear, said second end being selectively securable to said first end for selectively securing said strap assembly to said article of footwear;
an extension means for positioning said magnetometer assembly away from a foot of a user, said extension means being operationally coupled between said strap assembly and said magnetometer assembly;
wherein said extension means further comprises:
a horizontal extent with a first end operationally coupled to said strap assembly, said horizontal extent producing a lateral spacing between the foot of the user and the magnetometer assembly; and
a vertical extent operationally coupled between a second end of said horizontal extent and said magnetometer assembly, said vertical extent producing a vertical spacing of said magnetometer assembly above a surface.

14. The combination of claim 12, further comprising a cable assembly having a first end coupled to said magnetometer assembly, said cable assembly having a second end coupled to said control assembly, said cable assembly routing signal communication between said magnetometer assembly and said control assembly.

15. The combination of claim 12, further comprising:
a first transceiver operationally coupled to said magnetometer assembly for transmitting signal from said magnetometer assembly and receiving signals from said control assembly;
a second transceiver operationally coupled to said control assembly for transmitting signals from said control assembly and receiving signals from said magnetometer assembly.

16. The combination of claim 12, wherein said control assembly further comprises a housing, said housing being coupleable to an article of clothing of a user facilitating hands-free operation.

17. The combination of claim 12, wherein said coupling means further comprises a strap assembly adapted for being secured around a heel portion of said article of footwear, said strap assembly having a first end positionable adjacent to a first side of said article of footwear, said strap assembly having a second end positionable along a second side of said article of footwear and over a top of said article of footwear, said second end being selectively securable to said first end whereby said strap assembly is selectively secured to said article of footwear.

18. The system of claim 17, wherein said strap assembly further comprises a first portion of hook and loop fastener operationally coupled to said first end of said strap assembly and a second portion of hook and loop fastener operationally coupled to said second end of said strap assembly, said first portion of hook and loop fastener being complementary to said second portion of hook and loop fastener.

* * * * *